United States Patent [19]

Hachima

[11] Patent Number: 5,276,924
[45] Date of Patent: Jan. 11, 1994

[54] METHOD AND APPARATUS FOR DISPOSING OF BODY WASTES

[76] Inventor: Hiroki Hachima, 11-1, Ichiban-cho, Chiyoda-ku, Tokyo, Japan

[21] Appl. No.: 749,547

[22] Filed: Aug. 23, 1991

[30] Foreign Application Priority Data

Aug. 24, 1990 [JP] Japan .................. 2-87448[U]
Jan. 8, 1991 [JP] Japan .................. 3-59817
Aug. 1, 1991 [JP] Japan .................. 3-192388

[51] Int. Cl.$^5$ .......................................... A47K 11/02
[52] U.S. Cl. .......................................... 4/111.1
[58] Field of Search .................. 4/111.1, 111.2, 111.3, 4/111.4, 111.5, 111.6, 449, DIG. 17; 110/250; 34/1 P

[56] References Cited

U.S. PATENT DOCUMENTS

| | | | |
|---|---|---|---|
| 3,020,559 | 2/1962 | Blankenship et al. | 4/131 |
| 3,139,626 | 7/1964 | Blankenship | 4/131 |
| 4,051,561 | 10/1977 | Frankel et al. | 4/131 |
| 4,546,502 | 10/1985 | Lew | 4/111.1 X |
| 4,627,116 | 12/1986 | Shimizu | 4/111.1 X |
| 4,631,133 | 12/1986 | Axelrod | 110/250 X |
| 4,633,535 | 1/1987 | Louvo | 4/111.5 X |
| 5,152,074 | 10/1992 | Kishi | 4/111.1 X |

FOREIGN PATENT DOCUMENTS 0107633  2/1984  European Pat. Off. .

Primary Examiner—William A. Cuchlinski, Jr.
Assistant Examiner—W. Morris Worth
Attorney, Agent, or Firm—Lorusso & Loud

[57] ABSTRACT

There is provided a small apparatus for disposing of body wastes. The apparatus includes a stirring chamber which is connected to a discharge opening of a toilet bowl, and in which the body wastes and the absorbent are mixed together; and a rotary heating kiln which is formed together with the stirring chamber, and which has a heater for further heating and drying the mixture in the stirring chamber. The body wastes which have been heated, dried and solidified are stored in a storing portion and are collected. Thus, the apparatus is capable of quickly disposing of the body wastes, and of readily handling the solid wastes after the body wastes have been disposed, and of preventing environmental pollution.

9 Claims, 10 Drawing Sheets

FIG. 11
FIG. 12
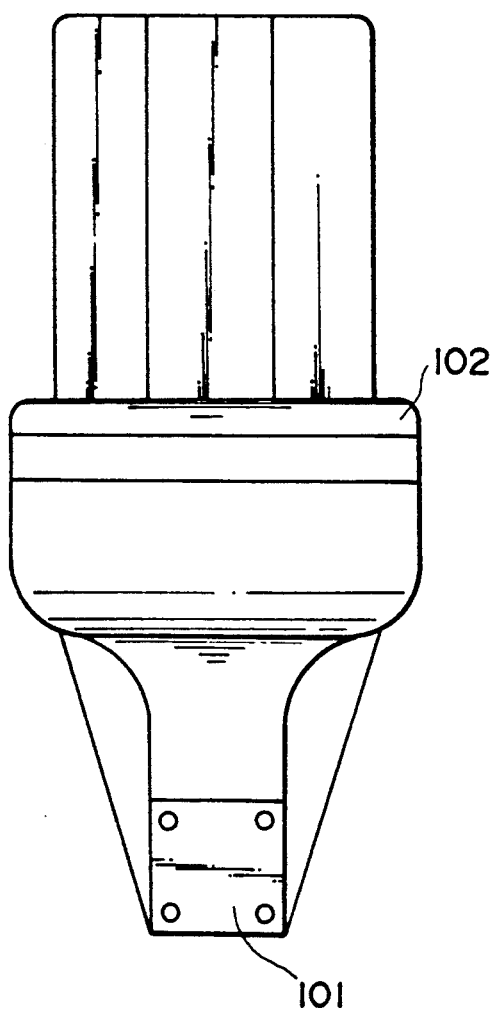
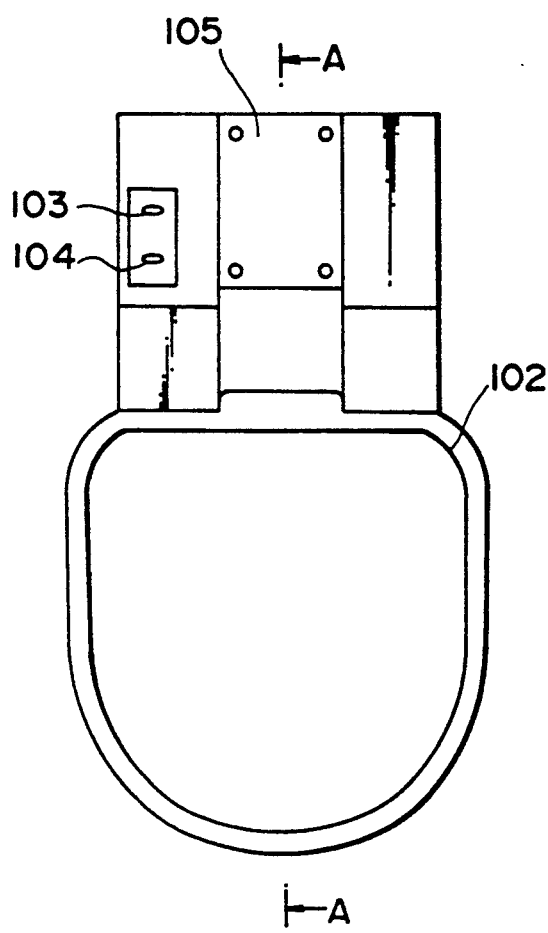

METHOD AND APPARATUS FOR DISPOSING OF BODY WASTES

BACKGROUND OF THE INVENTION

1. Field of the Invention

The present invention relates to a method of heating, drying and solidifying body wastes and an apparatus therefor.

2. Description of the Related Art

Methods of disposing of body wastes vary according to nations, climates, cultural levels, eating habits and the like.

Methods of washing away wastes have been widely employed in damp regions for a long time. In the simplest method, wastes are directly washed away in rivers instead of otherwise being disposed. In regions where sewers exist a method has been developed in which wastes are flushed away into the sewers by washing the toilets. In contrast to such sewerage disposal, a drying disposal has been employed in dry inland regions. In desert regions wastes are dried by burning sand and are scattered in the wind. Wastes are used as fuel in regions where vegetation serving as fuel is scarce.

In agricultural areas, a collecting method (night soil method) has been firmly established to use body wastes as manure. In the past body wastes were used widely, serving the valuable function of manure; nowadays, however, the use of wastes as manure is avoided because of hygienic considerations, including the prevention of epidemics. As agricultural techniques improve and modernize, body wastes have been replaced with chemical fertilizers, and have been disposed of in various kinds of disposing facilities in which body wastes are treated, such as by chemical, oxidizing, wet-oxidizing, and vacuum evaporation drying methods. Such facilities and methods are significant as transitional methods until public sewers and terminal disposing facilities are completed. Upon their completion, the body waste disposing facilities have become a part of the terminal disposing facilities.

Toilets are roughly classified into three types in accordance with the method of disposing of body wastes: collection-type (night soil-type) toilets, flush-type toilets and special toilets. Collection-type toilets are further classified into three types: a scooping-up type for scooping up body wastes; a simple flush type for scooping up wastes which have been washed with a foam washing liquid and a small amount of water; and a special washing-water circulating type for scooping up wastes which have been broken down with special recycled washing water. In all three types of toilets, body wastes are stored in enclosed concrete tanks, retaining tanks or the like. Flush toilets are further classified into two types: a waste-cleaning tank type for discharging wastes to sewers having no terminal disposing facilities; and a discharge type for directly discharging wastes to sewers having terminal disposing facilities. Special toilets are further classified into three types: a chemical-treatment type for disposing wastes with chemicals; a heat-treatment type for incinerating or heat-treating wastes; and a compost-treatment type for breaking down wastes by the operation of microbes.

In all methods of disposing of body wastes by any type of toilet, in the end, wastes are discharged into rivers and the like. As the amount of discharged wastes increases, so does the amount of contaminants discharged into rivers, thereby exceeding the capacity of the rivers, that is, the natural environment, to clean the wastes. As a result, a red tide occurs in closed-system water areas, and the water in the sewers becomes the cause of pollution.

Flush toilets require an enormous amount of water.

In the interest of environmental protection, a compost type toilet has been devised in which after post-use sawdust or the like is introduced, and body wastes are fermented while being stirred mechanically. However, in the type of toilet where a cleaning tank is required, a large tank is also required for settling, concentrating and fermenting the wastes. Such a toilet cannot be directly adapted for use in houses.

SUMMARY OF THE INVENTION

The object of the present invention is therefore to provide a method and a small apparatus for quickly disposing of body wastes which do not discharge the wastes into rivers and the like, and which are capable of preventing environmental pollution and of readily handling solid wastes after the body wastes have been disposed.

The present invention provides a method of disposing of body wastes in a toilet, comprising the steps of: stirring and breaking down temporarily stored body wastes; adding an absorbent to the body wastes so as to remove the moisture from the body wastes and thereby solidify them; and heating, drying and solidifying the body wastes by heating means.

This invention also provides an apparatus for disposing of body wastes, comprising: a stirring chamber which is connected to a discharge opening of a toilet, and in which the body wastes and the absorbent are mixed together; and a rotary heating kiln which is formed together with the stirring chamber, and which has heating means for further heating and drying the mixture in the stirring chamber.

Devices for absorbing, heating, drying and solidifying the body wastes may be provided in two stages.

This invention is capable of efficiently disposing of the body wastes in a short time. This is made possible by dividing the disposing process into two steps: a primary step in which the wastes are broken down while being stirred, and an absorbent is introduced to remove the moisture from them; and a secondary step in which the wastes, which have been more or less dried and solidified, are further heated and dried by microwave heating or dielectric heating, and are thereby solidified. The absorbent used in the invention is very effective in removing the moisture from the body wastes. Heating by a microwave dielectric heating quartz tube has a germicidal action, and is very effective in disposing of the body wastes mixed with microbes which may be a cause of contagious diseases.

A powdered, granulated or fibrous absorbent, containing a liquid retaining substance or a liquid solidifying substance, may be added to the body wastes, thus absorbing the moisture in the wastes so as to solidify them. A microwave generator, a heater and the like may be used to heat, dry and solidify the body wastes. The absorbent may be collected for reuse. Dielectric heating is used as the heating means composed of two electrodes. The body wastes are stirred and mixed with the absorbent, and the heating means heat, dry and solidify the mixture in a rotary drying device.

BRIEF DESCRIPTION OF THE DRAWINGS

FIG. 11 is a front view showing the toilet with the apparatus for disposing of body wastes of the fourth embodiment;

FIG. 12 is a plan view showing the toilet with the apparatus for disposing of body wastes of the fourth embodiment.

DESCRIPTION OF THE PREFERRED EMBODIMENTS

The embodiments of the present invention will be described below in detail with reference to the drawings.

An apparatus for disposing of body wastes of the invention has a mechanism to absorb, dry and solidify the moisture in body wastes. In the invention, a mechanism for drying and solidifying body wastes is built into an ordinary toilet.

Figure 1:
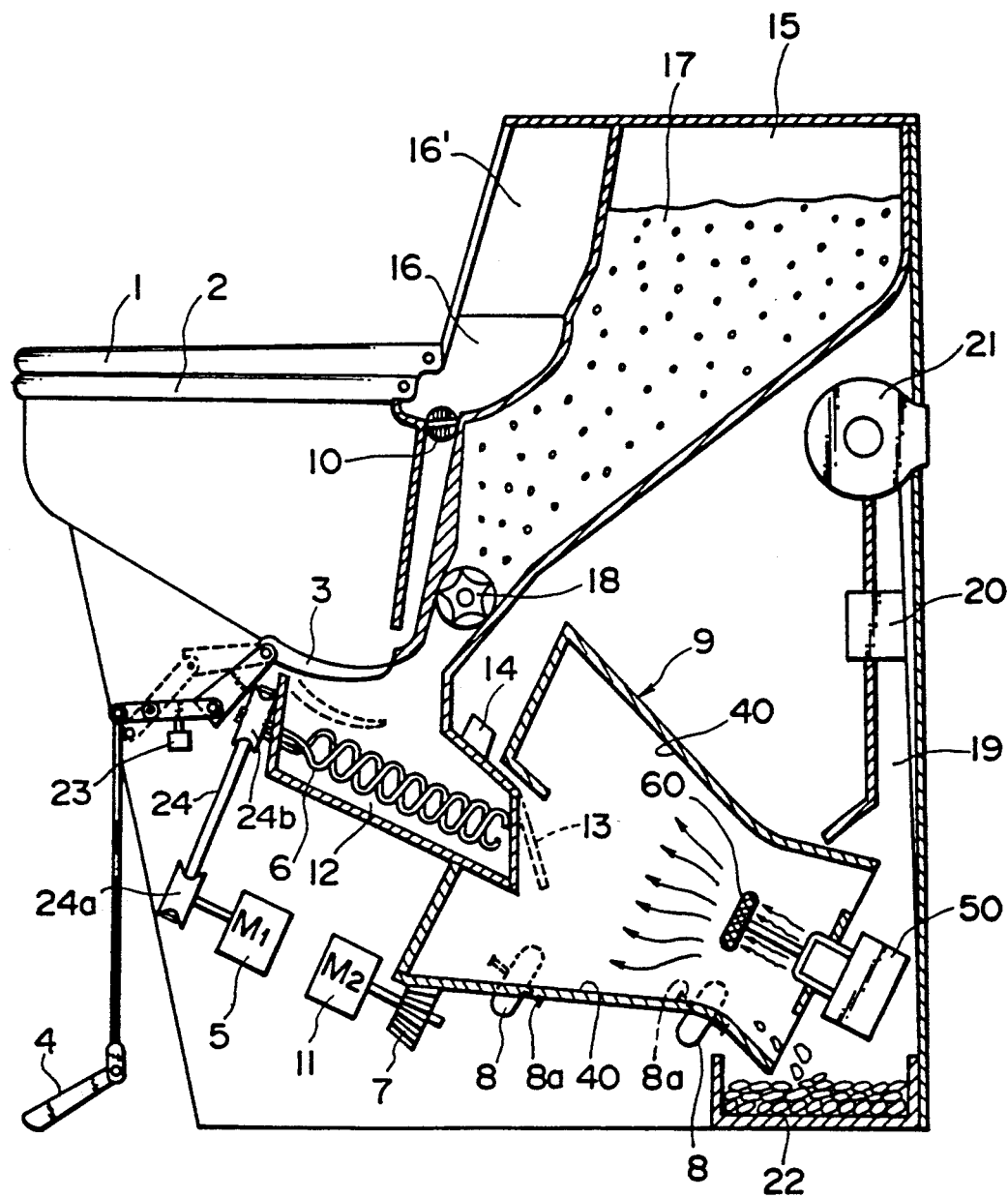
FIG. 1 is a schematic cross-sectional view, showing a first embodiment of the present invention, of a toilet with an apparatus for disposing of body wastes.

As shown in FIG. 1, the bowl under toilet seat 2 is constructed in the same manner as in an ordinary toilet, and is closed off by a toilet receiving valve 3. When a toilet lid 1 is closed, the bowl under the seat 2 is tightly closed so that odors and heat do not leak outside. A switch or a sensor (not shown) detects that body wastes are present on the valve 3 and that the lid 1 has been closed, whereby a disposing process described later begins.

After the toilet has been used, the operation of a valve opening pedal 4 sends body wastes stored by the valve 3 to a stirring chamber 12, and it simultaneously turns ON an operation start switch 23, thus starting a driving motor 5; and a stir feeding system 6 having a spiral rod begins to stir the body wastes with the aid of belt 24 and pulleys 24a and 24b.

Before the toilet is used, a knob or a lever on the outside is operated to actuate a rotary valve 10. A bubble generator 16 is thereby operated to wet the inside of the toilet with a cleaning agent, such as a surface active agent. This is effective in aiding the quick discharge of the body wastes.

The start switch 23 also actuates a water absorbing agent feeding device 18 at the same time that it actuates the motor 5. The feeding device 18 is used for feeding a fixed amount of a water absorbing agent 17 for a fixed amount of time. A powdered, granulated or fibrous absorbent is supplied from a hopper 15 and is stirred together with the body waste. At this stage, because the body wastes are broken down, a liquid retaining substance or a liquid solidifying substance contained in the absorbent comes into full contact with the body wastes, thereby absorbing the moisture in the wastes and reducing the degree of moisture. For example, a silica gel, an aluminum oxide-base substance, a hydrophilic polymer, a highly water-absorbent polymer, a mineral powder, a vegetable fiber, or mixtures of these substances are used as absorbents having the function of retaining or solidifying a liquid.

Silica gel and the aluminum oxide-base substance release the absorbed water upon heating so that they can be reused. The highly water-absorbent polymer has the property of absorbing water and swelling itself so as to turn the water into gel as soon as the water is contacted. For instance, an acrylic acid soda system and a starch/acrylic acid system have an absorption capacity of about 1,000 g/g (grams water per gram of water-absorbent polymer), and CMC and POVAL systems of 100–400 g/g. One of the properties of the highly water-absorbent polymer is water retention under pressure: capability of retaining a large portion of an absorbed liquid even under pressure. Such a highly water-absorbent polymer used as an absorbent is not reused, but collected in a state in which it is either separated or not separated from solid wastes. The polymer is then carried to facilities for treatment.

Also, since the highly water-absorbent polymer has a carboxylic acid group, it has the advantage of being capable of adsorbing, for example, an ammonia odor, and therefore of removing this odor from the body wastes.

The absorbent removes the moisture to some extent. A delay switch (not shown) interlocked with the operation start switch 23 actuates an open/close operating system 14 to open an open/close lid 13. At the same time, the stir feeding system 6 drops the body wastes, which have become more or less solid, into a rotary heating kiln 9, which has begun rotating by the rotation of a driving roller 7 interlocked with a driving motor 11. A supporting roller 8 ensures smooth rotation of the rotary heating kiln 9. The roller 8 is pivotally connected to a pivotal shaft 8a provided in a fixed portion.

Figure 3:
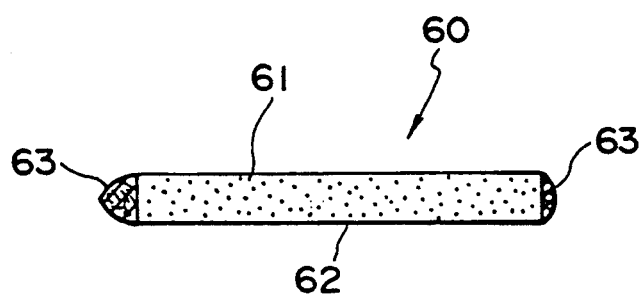
FIG. 3 is a cross-sectional view showing the construction of a microwave dielectric heating quartz tube used as a heating device of the invention.
Figure 4:
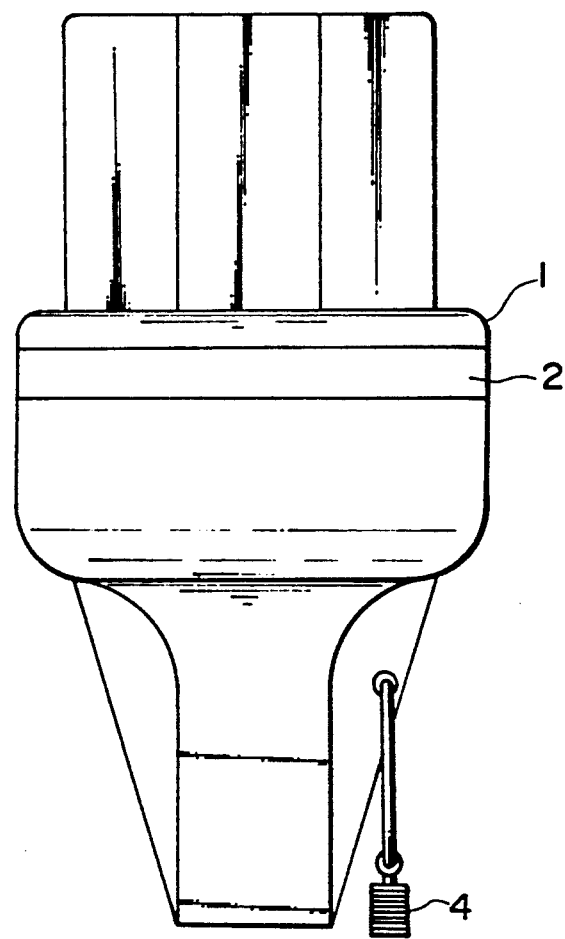
FIG. 4 is a front view of the toilet with the apparatus for disposing of body wastes of the invention.

When the body wastes are dropped into the rotary heating kiln 9, a sensing switch (not shown) is operated. Thereby microwave energy (2450 MHz) generated by a microwave generator 50 (described later) is received by a microwave dielectric heating quartz tube 60 (made by Nara Seiki) for heating the body wastes to about 1050° C. In this embodiment, as shown in FIG. 3, the microwave dielectric heating quartz tube 60, together with quartz wool 63, is sealed in a quartz tube 61 stuffed at both ends thereof with a powder 62 mixed with aluminum and carbon.

With the above arrangement, the body wastes can be dried in a very short time. Because the rotary heating kiln 9 heats the body wastes while rotating them, the body wastes are more quickly dried. An inner wall of the rotary heating kiln 9 inclines gently at first and gradually becomes steeper. Such a construction is optimal for smooth operation of drying, solidifying and discharging the body wastes.

As described above, in this embodiment, the microwave generator 50 and the microwave dielectric heating quartz tube 60, which is heated by receiving the microwaves from the microwave generator 50, both serving as heating means, are arranged in the rotary heating kiln 9.

Figure 6:
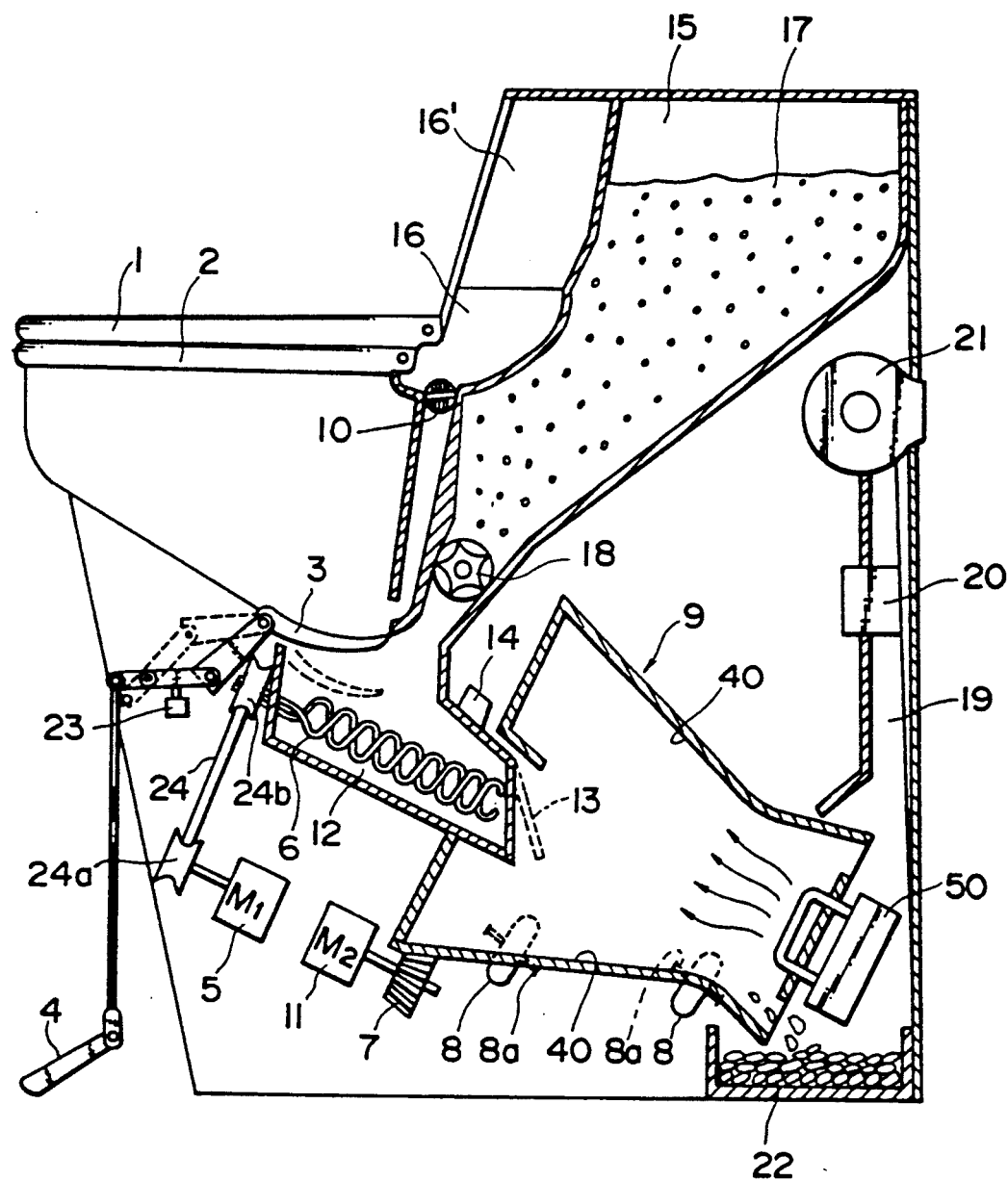
FIG. 6 is a schematic cross-sectional view, showing a second embodiment of the present invention, of a toilet with an apparatus for disposing of body wastes.

Furthermore, as illustrated in FIG. 6, in a second embodiment, microwaves generated by the microwave generator 50 may also irradiate the rotary heating kiln 9, acting as an applicator 29 (described later).

When the degree of moisture becomes 30–50% or less, the microwave is more effective in drying body waster than a conventional heating device, such as a heater. The amount of heating time can thus be shortened to one tenth. The moisture inside the solid wastes of the body wasters, whose moisture has been adsorbed by the adsorbent to some extent, is forced out by the effect of the microwave. It is possible to provide a heater or a hot air generator used as an auxiliary heating means. Hot air provides heat that evaporates the moisture forced out of the solid wastes, and blows away saturated steam layers formed around the solid wastes, thus further improving the efficiency of drying. One feature of microwave heating lies in the fact that heating is proportional to the dissipation factor ($\epsilon \times \tan\delta$) of a given substance, and the dissipation factor is substantially proportional to the degree of moisture. Those portions containing more water are heated more and more quickly dried than portions containing less water. In this way, the inside and outside of the substance are uniformly and quickly dried.

The solid portions of the body wastes, which have been more or less dried by the absorbent, are further dried by the microwave in a very short time.

Since microwave heating vibrates a dipole and ions in a molecule to heat a substance from the inside, it permits faster heating than heating from the outside of the substance. For this reason, the temperature inside the substance can be fully increased in a short time, and the body wastes can be sterilized by rapid and complete heating. In addition, high-frequency electrical fields are known for having a germicidal action, and microwave heating has the advantage of drying and sterilizing the body wastes simultaneously.

Figure 2:
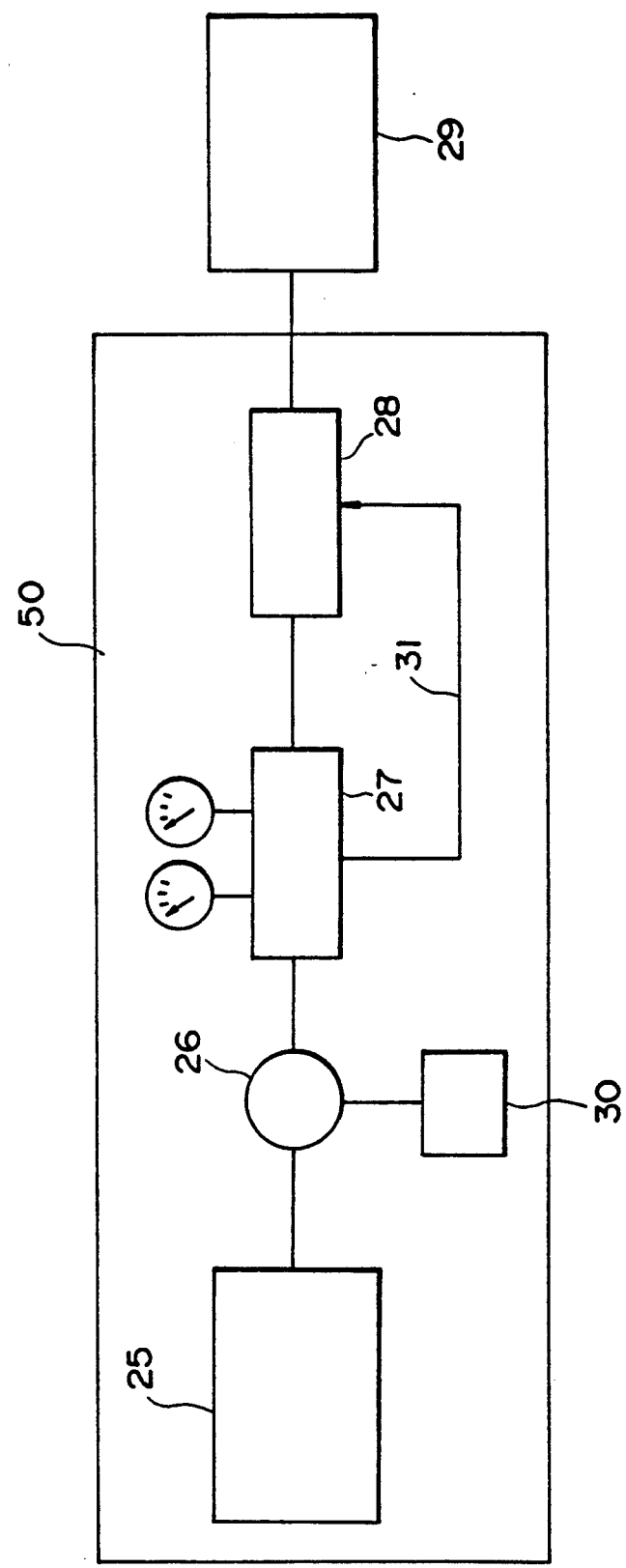
FIG. 2 is a block diagram showing a microwave generating mechanism used as a heating device of this invention.

A microwave heating device will now be explained with reference to FIG. 2.

A part of a first heating/drying means, which is the microwave generator 50, is composed of a microwave oscillator 25, an isolator 26, a power monitor 27, and an impedance adjusting device 28. A magnetron or a klystron is used as the microwave oscillator 25. Microwaves generated by the microwave generator 50 are supplied to the applicator 29, which is the portion where the microwave impinges on the body wastes to heat them. In this invention, the applicator 29 corresponds to the rotary heating kiln 9 in which the microwave heats and dries the body wastes. A microwave choke or a microwave absorbing body is provided in an opening communicating with the rotary heating kiln 9 so that the microwave does not leak.

When the microwave oscillator 25 is connected to the applicator 29 and when the latter is not provided with an electrical radiation absorbing body, the microwave oscillator 25 does not coordinate with the applicator 29. A large amount of electricity is thus reflected from the applicator 29, returning to the microwave oscillator 25. In such a case, the electrical field of a high microwave is generated, and the magnetron may be damaged. To avoid this, the isolator 26 or the impedance adjusting device 28 is inserted between the microwave oscillator 25 and the applicator 29. The isolator 26 prevents a reflected wave from returning toward the microwave oscillator 25. Water load 30 absorbs energy. The impedance adjusting device 28 adjusts composite impedance so that impedance on the side of a power supply and that on the side of the load are equalized. The impedance adjusting device 28 operates so that microwave electricity is effectively consumed on the side of the load, and it is adjusted so that electricity of a wave reflected from the power monitor 27 becomes zero.

A control signal, which may serve as the electricity of the wave reflected from the power monitor 27, is input to the impedance adjusting device 28 through a signal line 31. This input controls the input microwave electricity in accordance with the configurations of the solid wastes and the degree of moisture thereof in the rotary heating kiln 9.

Figure 5:
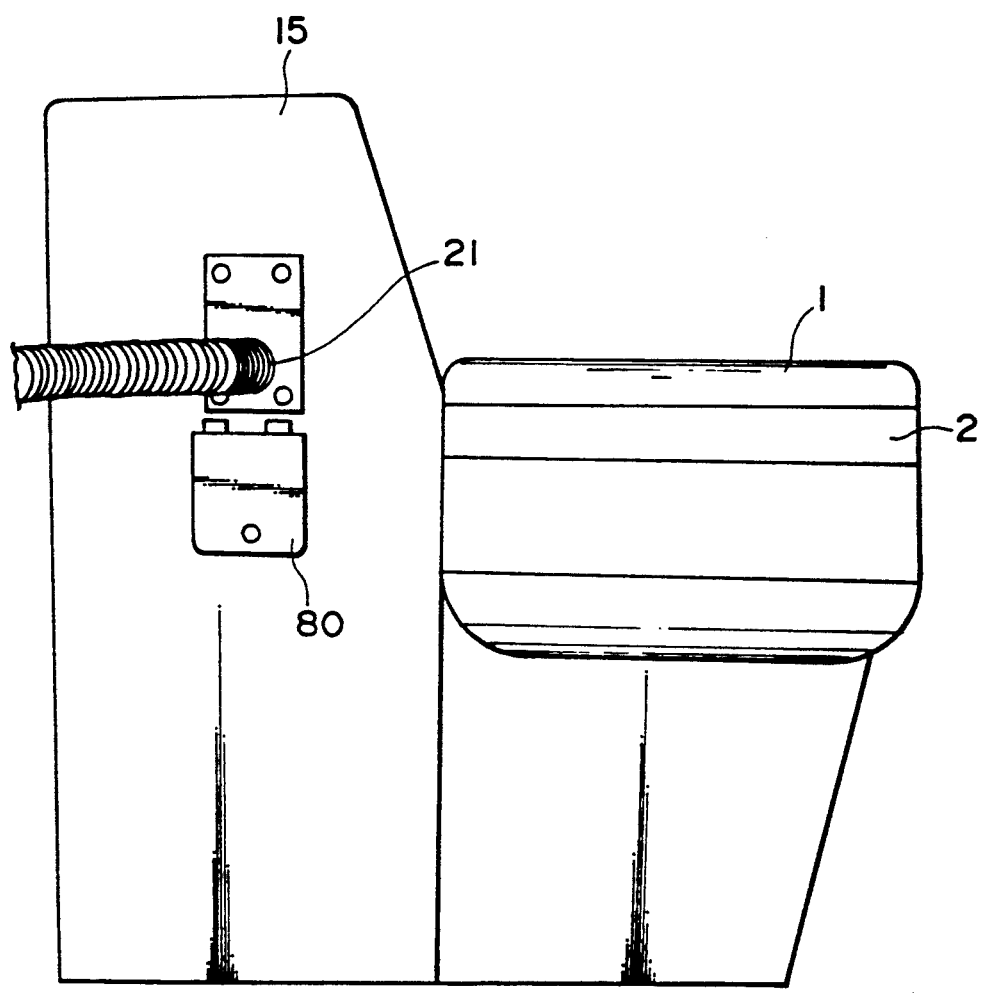
FIG. 5 is a side view of the toilet with the apparatus for disposing of body wastes of the invention.

In FIG. 1, odors generated in the rotary heating kiln 9 pass through an exhaust duct 19 and are discharged outside by a fan 21 after they have been treated with an absorbent in a deodorizing filter 20. In other words, the motor-driven fan 21 draws the air from the rotary heating kiln 9, and discharges it outside through the filter 20. The absorbent accommodated in the filter 20 absorbs the odors and moisture. As shown in FIG. 5, the filter 20 is replaced through a hatch 80 provided in the main body of the toilet.

The heating/drying means is constructed in such a manner that it can be operated only when the lid 1 is closed. A timer can determine the operational sequence and time of the heating/drying means. It is possible to control the heating/drying means by measuring a rise in the temperature and the amount of the solid wastes.

Preferably, the toilet, the toilet receiving valve 3, the stirring chamber 12, the open/close lid 13, and the surface of the rotary heating kiln 9, with which the body wastes come into contact, are coated with a water/oil repellent material 40, such as, an electroless nickel plating solution (Nimuhuron/Metahuron process made by UEMURA & CO., LTD) so that these components can be water/oil repellent.

The electroless nickel plating solution has excellent properties of wear resistance, low frictional resistance and self-lubrication. The provision of this water/oil repellent material facilitates the operation of sending, washing and disposing of the body wastes.

A fluorine polymer may also be used as the water/oil repellent material. Polytetrafluoroethylene (PTFE), an example of a fluorine polymer, has ideal properties, such as chemical and weather resistance, and a low coefficient of friction, in addition to water repellency.

Figure 7:
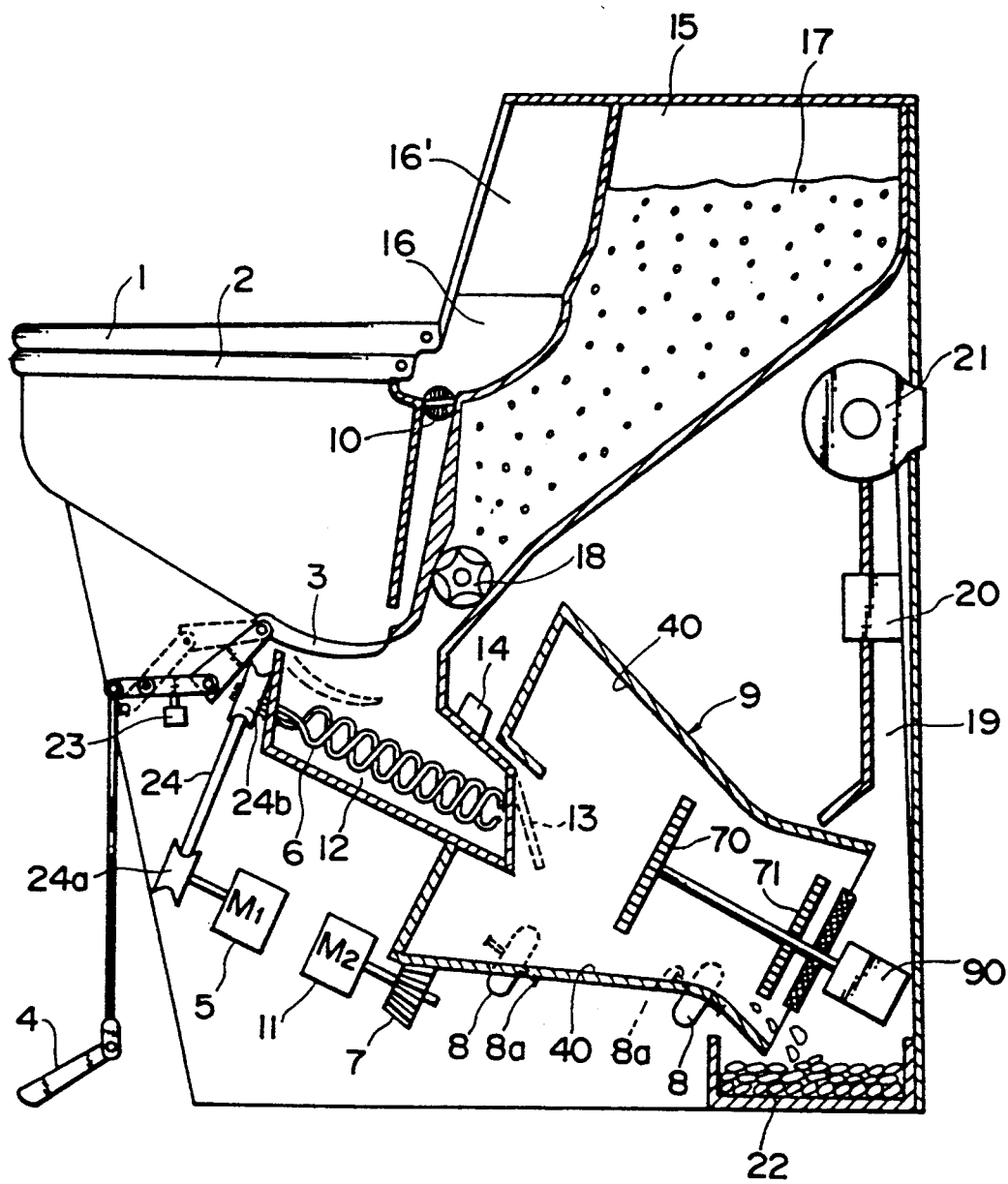
FIG. 7 is a schematic cross-sectional view, showing a third embodiment of the present invention, of a toilet with an apparatus for disposing of body wastes.

As shown in FIG. 7, a third embodiment will now be described which employs a dielectric heating device in place of the heating/drying means of the microwave generator.

In this embodiment, two opposite electrodes 70 and 71 are arranged in the rotary heating kiln 9. A high frequency of several MHz to 10–90 MHz, generated by a high-frequency generator 90, is applied between the two electrodes 70 and 71. Then, body wastes to which an absorbent has been added is dielectrically-heated and dried in the same manner as in the first embodiment.

The wastes in the rotary heating kiln 9, which have thus been heated and dried by a heating means and solidified, are stored in a storage portion 22.

The above microwave dielectric heating quartz tube 60, the dielectric heating device, and a high-frequency heating device, all of which are heating means, are installed in fixed positions. However, the shapes and locations of these components depend on different conditions. For instance, the heating means may be installed (not shown) inside the lid 1 to preheat the body wastes before they are sent into the stirring chamber 12 so that the speed at which the body wastes are dried is quickened.

Next, a fourth embodiment will be described.

This embodiment is a toilet in which heating/drying devices are arranged in two stages.

Figure 8:
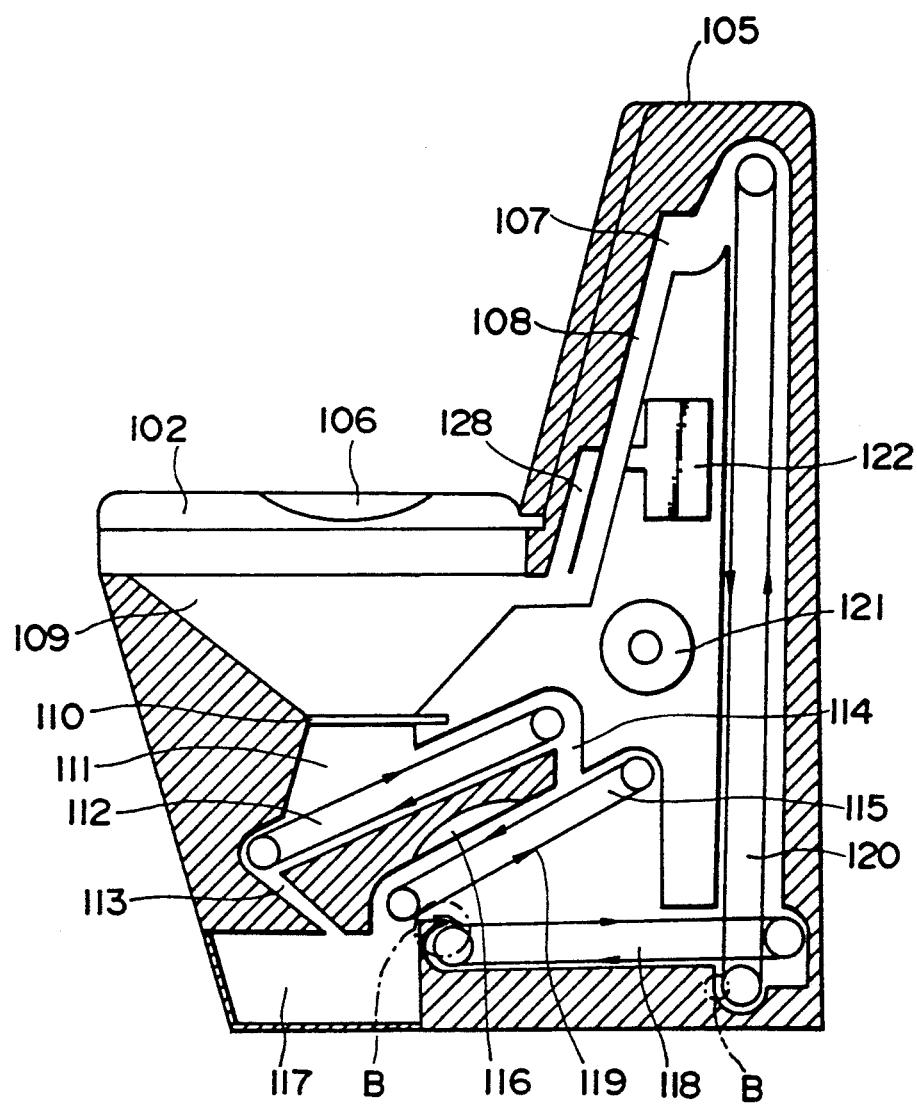
FIG. 8 is a schematic cross-sectional view, showing a fourth embodiment of the present invention, of a toilet with an apparatus for disposing of body wastes.

As illustrated in FIG. 8, a chamber 109 is provided under a toilet seat in the same way as in an ordinary toilet. The bottom of the chamber 109 is closed off by an open/close lid 110. When a toilet lid 102 is closed, body wastes on the open/close lid 110 are tightly closed within the chamber 109. A switch or a sensor (not shown) detects that the body wastes are present on the open/close lid 110 and that the lid 102 has been closed, whereby a disposing process described later begins.

A first heating/drying device 106, composed of a heater for generating hot air and an applicator, that is, a microwave generator for generating microwaves, is installed in an inner portion of the lid 102 of the toilet.

A powdered, granulated or fibrous absorbent is supplied from a storing area 107 to the chamber 109 through a tube 108. The absorbent surrounds the outer surfaces of the body wastes. A liquid retaining substance or a liquid solidifying substance contained in the absorbent comes into contact with the body wastes, thereby absorbing the moisture and reducing the degree of moisture. The substances mentioned in connection with the first embodiment may be used as the absorbent having the function of retaining or solidifying a liquid. The same heating effect as that described above is obtainable.

Figure 9A:
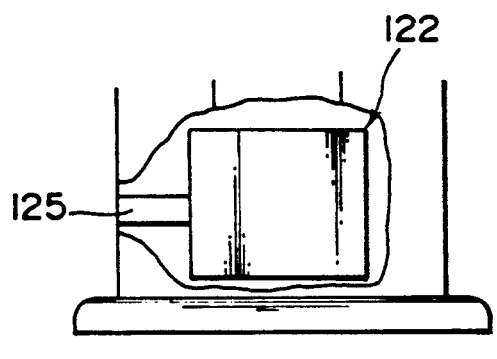
FIG. 9(a) is a view showing the outward appearance of a deodorizing device for use with the toilet having the apparatus for disposing of body wastes.
Figure 9B:
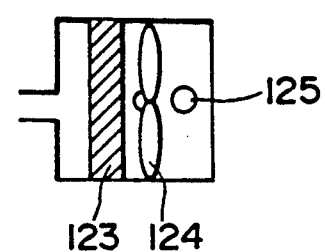
FIG. 9(b) is a cross-sectional view of the deodorizing device.

The body wastes with their moisture absorbed to some extent by the absorbent are further dried and solidified by the heat from the microwave and the heater. Odors generated in chambers 109 and 119 are not only absorbed by the absorbent, but also deodorized by a deodorizing device 122. The deodorizing device 122 communicates with the chamber 109 via the tube 128. With reference to FIG. 9, the deodorizing device 122 composed of a filter 123, a fan 124 and an air outlet 125 will be explained. The air in the chamber 109 is drawn by the motor-driven fan 124 and is then discharged outside through the air outlet 125 after having passed through the filter 123. The absorbent accommodate in the filter 123 absorbs the odors and moisture.

Figure 13:
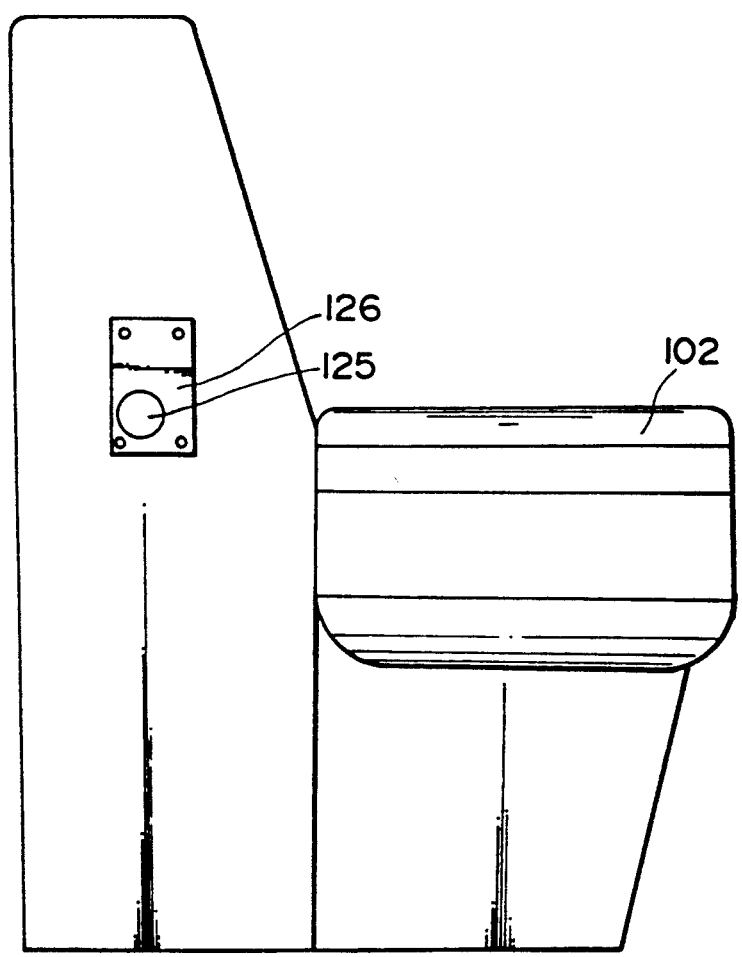
FIG. 13 is a side view showing the toilet with the apparatus for disposing of body wastes of the fourth embodiment.

As shown in FIG. 13, the filter 123 is replaced through a hatch 126 provided in the main body of the toilet.

After the body wastes have first been dried in the chamber 109, the open/close lid 110 is opened to drop the solid wastes onto a first belt conveyor 112 under the lid 110. After the solid wastes have fallen onto the belt conveyor 112, the open/close lid 110 is closed again. As shown in FIG. 8, the belt conveyor 112 is rotated clockwise by a motor 121, thus dropping the solid wastes through a passage 114 onto a second belt conveyor 115 arranged under the belt conveyor 112. A second heating/drying device 116 is provided over the belt conveyor 115 in the chamber 119. The second heating/drying device 116, like the first heating/drying device 106, is composed of the heater and the microwave generator. As soon as the solid wastes fall onto the belt conveyor 115, a sensor (not shown) detects that they have fallen. Thereby the belt conveyor 115 begins rotating anti-clockwise in FIG. 1, and the second heating/drying device 116 also begins operating. At this stage, the solid wastes are completely dried. A belt conveyor made of metal is inappropriate because it is heated by a microwave; therefore, it is desirable that the belt conveyor be made of plastics or ceramics. The belt portion of the belt conveyor 115 forms a reticulate structure that separates the absorbent from the solid wastes. Since the absorbent, adhering to the surfaces of the solid wastes, has a smaller diameter than the solid wastes, it falls through the reticulations of the belt conveyor 115. On the other hand, the solid wastes are carried by the belt conveyor 115, dropped and stored in a storage portion 117. As shown in FIG. 11, the solid wastes in the storage portion 117 are taken out through a hatch 101 provided in the toilet. The wastes are then collected and carried to final disposing facilities.

The absorbent dropped through the reticulations of the belt conveyor 115 is received by a third belt conveyor 118 arranged under the belt conveyor 115. The third belt conveyor 118 rotates clockwise in FIG. 1. The absorbent is collected and supplied by a fourth belt conveyor 120 to an absorbent retaining portion 107. The fourth belt conveyor 120 is vertically installed. The lower end of the conveyor 120 receives the absorbent, whereas the upper end feeds it into the absorbent retaining area 107.

Figure 10:
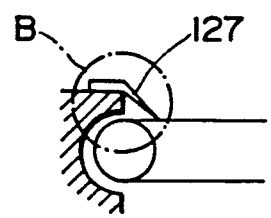
FIG. 10 is an enlarged view of a portion indicated by B of FIG. 8.

As shown in the enlarged portion B of FIG. 10, pawls 127 are attached to the edges of the third and fourth belt conveyors 118 and 120. The pawls 127 scrape off the absorbent adhering to the surface of the belt conveyors 118 and 120.

A passage 113 is formed under one end of the conveyor 112. It is used for collecting the solid wastes, dropped from the first belt conveyor 112, into the storage area 117.

The fourth embodiment has mechanisms collecting the absorbent for reuse. However, when the absorbent is not collected or when it is separated from the solid wastes in other disposing facilities, such mechanisms in the toilet (the third and fourth belt conveyors 118 and 120, and other components) may not be required.

Another deodorizing device or a passage (not shown) communicating with the deodorizing device 122 may be provided in order to absorb the odors and moisture in the chamber 119, in which the second heating/drying device and the conveyors are provided.

As shown in FIG. 12, a hatch 105 for replenishing absorbents is provided in an upper end of the toilet, and another hatch 101 (see FIG. 11) for taking out the stored solid wastes is provided in a lower end of the same. Switches 103 and 104 for opening and closing the lid 102 are provided. The first heating/drying device 106 is constructed in such a way that it can be operated only when the lid 102 is closed. A timer is capable of setting time for operating the first heating/drying device 106 and subsequently opening the open/close lid 110. Also, it is possible to control the heating/drying device 106 and the lid 110 by measuring a rise in the temperature and the amount of the solid wastes.

Although a power source is required for the above driving motors and the heating devices of this invention, a solar radiation electricity generator is combined with the invention for use as such a power source. It is anticipated that apparatuses for disposing of body wastes, particularly those having solar radiation electricity generators, are ideally employed in various places where power sources are not commercially available, such as deserts, mountainous regions, campsites, shelters and the South Pole.

The present invention is not limited to the embodiments described above, and may be modified in accordance with the object of the invention. Modifications are not excluded from the scope of the invention.

As has been described in detail, this invention is capable of efficiently disposing of body wastes in a short time. This is made possible by dividing the disposing process into two steps: a primary step in which the wastes are broken down while being stirred, and an absorbent is introduced to remove the moisture form them; and a secondary step in which the wastes, which have been more or less dried and solidified, are further heated and dried by microwave heating or dielectric heating, and are thereby solidified.

Various absorbents mentioned in this invention are very effective in removing the moisture form body wastes. Microwave heating itself has a germicidal action, and is very effective in disposing of body wastes mixed with microbes which may be a cause of contagious diseases.

The apparatus for disposing of body wastes of this invention provides an advantageous effect in various places, such as deserts, high mountains and cold regions, and particularly in disaster-stricken areas where it is difficult to secure water and contagious diseases are likely to occur.

What is claimed is:

1. An apparatus for disposing of body waste comprising:
   a toilet bowl for receiving and collecting the body waste, said toilet bowl having a bottom discharge opening;
   a first valve member for selectively opening and closing the bottom discharge opening of said toilet bowl and manual means for selectively operating said first valve member;
   a stirring chamber located beneath said toilet bowl for receiving body waste discharged from said toilet bowl by gravity through said bottom discharge opening, a stirring element rotatably mounted in said stirring chamber, rotation means for rotating said stirring element and a stirring chamber discharge opening for discharging the body waste from said stirring chamber;
   a bin for holding a particulate moisture absorbent and having a bottom discharge opening in communication with said stirring chamber for discharging said moisture absorbent into said stirring chamber wherein said moisture absorbent is mixed with the body waste by the stirring element;
   rotary metering means, mounted in said bottom discharge opening of said bin, for feeding a fixed amount of said moisture absorbent into said stirring chamber responsive to operation of said manual means;
   a rotary kiln in communication with said stirring chamber for receiving body waste discharged through said stirring chamber discharge opening and heating means mounted within said rotary kiln for drying the body waste received within said rotary kiln; and
   a second valve member selectively movable between open and closed positions relative to the discharge opening of said stirring chamber, and means for moving said second valve member to said open position responsive to operation of said manual means.

2. An apparatus for disposing of body wastes according to claim 1, wherein said heating means is composed of a microwave generator and a microwave dielectric heating quartz tube that is heated by receiving a microwave from the microwave generator.

3. An apparatus for disposing of body wastes according to claim 1, wherein said heating means includes a dielectric heating device.

4. The apparatus of claim 1 further comprising a water-repellant coating covering the interior of at least one of said toilet bowl, said stirring chamber, and said rotary heating kiln.

5. The apparatus of claim 1 wherein said moisture absorbent is selected from the group consisting of silica gel, aluminum oxide, hydrophilic polymers, water-absorbent polymers, mineral powders and vegetable fibers.

6. The apparatus of claim 1 further comprising a collection bin for collecting dried waste discharged from said rotary heating kiln.

7. The apparatus of claim 1 wherein said heating means comprises a microwave generator which generates heat by irradiating walls of said rotary heating kiln.

8. An apparatus in accordance with claim 1 wherein said stirring chamber is inclined with respect to the horizontal and wherein said discharge opening of said stirring chamber is at an end of said stirring chamber opposite a second end of said stirring chamber which is in communication with said bottom discharge opening of said toilet bowl and wherein said stirring element serves to both mix said body waste and said moisture absorbent and to convey the resulting admixture to said discharge opening of said stirring chamber.

9. The apparatus of claim 1 wherein said bin is partially defined by wall means forming said toilet bowl, said wall means serving to separate the interior of said bin from the interior of said toilet bowl.

* * * * *